US012571588B2

(12) United States Patent
Schembecker et al.

(10) Patent No.: US 12,571,588 B2
(45) Date of Patent: Mar. 10, 2026

(54) ROTATING-SCREW DRYING REACTOR

(71) Applicant: TECHNISCHE UNIVERSITÄT DORTMUND, Dortmund (DE)

(72) Inventors: Gerhard Schembecker, Dortmund (DE); Kerstin Wohlgemuth, Witten (DE); Claas Matthis Steenweg, Dortmund (DE)

(73) Assignee: TECHNISCHE UNIVERSITÄT DORTMUND, Dortmund (DE)

( * ) Notice: Subject to any disclaimer, the term of this patent is extended or adjusted under 35 U.S.C. 154(b) by 898 days.

(21) Appl. No.: 17/794,378

(22) PCT Filed: Jan. 21, 2020

(86) PCT No.: PCT/EP2020/051385
§ 371 (c)(1),
(2) Date: Jul. 21, 2022

(87) PCT Pub. No.: WO2021/148108
PCT Pub. Date: Jul. 29, 2021

(65) Prior Publication Data
US 2023/0063353 A1 Mar. 2, 2023

(51) Int. Cl.
*F26B 17/20* (2006.01)
*F26B 5/04* (2006.01)

(52) U.S. Cl.
CPC .............. *F26B 17/20* (2013.01); *F26B 5/041* (2013.01)

(58) Field of Classification Search
CPC .. F26B 17/20; F26B 5/041; F26B 3/20; F26B 3/24
See application file for complete search history.

(56) References Cited

U.S. PATENT DOCUMENTS 3,583,681 A * 6/1971 Brown .................. B01F 25/823 366/136
4,030,205 A * 6/1977 Robertson ............. B29B 13/065 34/380
4,214,377 A * 7/1980 Maffet ...................... F26B 5/14 210/767
4,453,319 A * 6/1984 Morris .................. E21B 21/065 34/247
8,871,061 B2 10/2014 Beldring et al.
10,085,477 B2 * 10/2018 Maupin .................... A23B 7/06
10,526,228 B2 * 1/2020 McPherson ........... E21B 21/065

FOREIGN PATENT DOCUMENTS

BR PI0802414-6 B1 * 6/2017 ............... A23L 5/21
CN 104047195 A 9/2014
CN 108020068 A 5/2018
(Continued)

OTHER PUBLICATIONS

Translation, BR-PI0802414-6-B1 (Year: 2017).*
(Continued)

*Primary Examiner* — Jessica Yuen
(74) *Attorney, Agent, or Firm* — REISING ETHINGTON, P.C.

(57) ABSTRACT

The present disclosure relates to a rotating-screw drying reactor for filtering and drying a fluid-containing material, and to a method for continuously filtering and drying a fluid-containing material by means of the rotating-screw drying reactor.

24 Claims, 4 Drawing Sheets

(56) References Cited

FOREIGN PATENT DOCUMENTS

| | | | | | |
|---|---|---|---|---|---|
| CN | 110595193 | A | | 12/2019 | |
| DE | 1941163 | A1 | | 2/1971 | |
| EP | 3361198 | A1 | * | 8/2018 | ................ F26B 3/06 |
| WO | WO-2008132580 | A1 | * | 11/2008 | ............. F26B 17/20 |

OTHER PUBLICATIONS

European Office Action for European Application No. 20 701 955.5 dated Mar. 27, 2024 (6 pages).
International Search Report for International Application No. PCT/EP2020/051385 dated Aug. 24, 2020 (3 pages).
English Translation of International Search Report for International Application No. PCT/EP2020/051385 dated Aug. 24, 2020 (2 pages).
International Preliminary Report on Patentability for International Application No. PCT/EP2020/051385 dated Jul. 26, 2022 (7 pages).
English Translation of International Preliminary Report on Patentability for International Application No. PCT/EP2020/051385 dated Jul. 26, 2022 (7 pages).

* cited by examiner

ROTATING-SCREW DRYING REACTOR

INTRODUCTION

The subject matter of the present application relates to a screw conveyor drying reactor for the filtration and drying of a fluid-comprising material, and also to a process for the continuous filtration and drying of a fluid-comprising material by means of the aforementioned screw conveyor drying reactor.

Solids are frequently obtained from solutions by distilling off the solvent or from suspensions by filtering off mother liquor. The complete (thermal) removal of still-remaining solvent residues is referred to as drying. The simplest method for removing solvent residues is vacuum drying. For this, the solid to be dried is placed in a tared dish in a desiccator and this is evacuated by applying a vacuum. The reduced pressure accelerates the evaporation of the solvent.

Especially when removing aqueous solvents, these methods are highly time-consuming due to the vapor pressure of water. It is common to all of these methods that a filtercake of the solid is obtained at the end. The substantial preservation of the particulate properties (e.g. particle size distribution and degree of agglomeration) of the individual solid particles as such cannot be provided by this drying method.

Fluidized bed drying is a more gentle method for the controlled and uniform drying of moist solids. The intensive heat/mass exchange of the fluidized product means that this method is particularly effective and time-saving. The technology is also suitable for the postdrying of spray-granulated or extruded products comprising very low residual moisture content. Fluidized bed drying is used in all powder-processing industries. Fluidized bed drying has to a very great extent replaced time-consuming vacuum drying in the pharmaceutical industry. A disadvantage with fluidized bed drying is the fact that particles may be granulated to form agglomerates and the particles and agglomerates formed exhibit high abrasion and friability as a result of motion in the turbulent flow.

SUMMARY

It accordingly remains an object according to an embodiment to provide a drying apparatus and a drying process which permit rapid, efficient and controlled drying of a fluid-comprising material, prevent agglomeration of the particles to a very great extent, with preservation of the particulate properties, and at the same time minimize abrasion and friability.

To achieve the object per an embodiment, a screw conveyor drying reactor is provided, wherein the screw conveyor drying reactor has at least a first screw conveyor housing and at least one outer vacuum housing that at least partially surrounds the first screw conveyor housing,

- wherein the first screw conveyor housing has at least one housing wall, wherein this housing wall has at least one gas- and liquid-permeable but solid-impermeable wall section, wherein the vacuum housing is arranged at least below the gas- and liquid-permeable but solid-impermeable wall section and receives gas and liquid passing through the permeable wall section,
- wherein a conveying screw extends into the first screw conveyor housing and is mounted at least at one end of the housing, wherein the conveying screw is connected to a drive motor to form a continuous rotary connection,
- wherein the first screw conveyor housing has at least one inlet port for a fluid-comprising material, and at least one outlet opening for removal of the particles from which fluid has been extracted,
- wherein the conveying screw extends into the first screw conveyor housing in such a way that the material is transported from the inlet port to the outlet opening, and wherein the conveying screw has screw flights,
- wherein the vacuum housing is sealed off with respect to the first screw conveyor housing for the purpose of applying a vacuum,
- wherein the vacuum housing has at least one connection port for applying a vacuum and for discharging fluid which penetrates into the vacuum housing through the gas- and liquid-permeable wall section of the screw conveyor housing.

The screw conveyor drying reactor, per an embodiment, advantageously enables a rapid, efficient and controlled filtration and drying of a fluid-comprising material while preserving the particle form and particle size distribution and while avoiding agglomeration of the particles.

Moreover, the screw conveyor drying reactor enables drying which is gentle on the material, since the particles obtained in the drying of the fluid-comprising material exhibit virtually no abrasion or friability.

A further advantage, per an embodiment, is that the screw conveyor drying reactor enables the production of free-flowing particles. It has surprisingly been found that the solvent-comprising particles can have virtually the same particle size distribution before and after the filtration and drying by means of the screw conveyor drying reactor of the invention.

In the context hereof, the term "fluid" is understood for example to mean organic and inorganic solvents, especially organic and inorganic solvents that are liquid at 23° C.

In the context hereof, the term "room temperature" is understood to mean 23° C.

In the context hereof, the term "material" is understood to mean a solid.

In the context hereof, the term "fluid-containing material" is understood for example to mean a solid comprising organic and/or inorganic solvent or solvent mixtures, organic and/or inorganic solvent or solvent mixtures comprising particles, in particular a suspension, and also solids dissolved in an organic and/or inorganic solvent or solvent mixture.

The term "solid" encompasses particles.

According to a further embodiment, the screw flights of the conveying screw may be spaced apart in a regular, varying and/or irregular manner. However, it is also possible to use other geometries of conveying screws in terms of the arrangement of the screw flights. Another arrangement that is for example irregular with respect to the spacing of the screw flights of the conveying screw may also be suitable according to an embodiment. In order to prevent agglomeration of particles, per an embodiment, it may however also be advantageous for the spacing of the screw flights of the conveying screw to be selected such that no pressure is exerted on the fluid-containing material for pressing out fluid. The regular spacing of the screw flights of the conveying screw may for example have the advantage that the particles formed in the screw conveyor drying reactor are not compressed during transport through the screw conveyor drying reactor, such as to prevent the formation of agglomerates of particles as a result of a compression pressure which is exerted on the particles for example in the case of narrowing screw flight spacings. A pressing-out or squeezing-out of fluid, as for example results in a compression cake when dewatering slurries, is avoided in an embodiment in which the screw flights of the conveying screw are regularly spaced apart.

The helix number may be between ≥2 and ≤200, preferably ≥10 and ≤150, more preferably ≥15 and ≤100, more preferably still ≥20 and ≤80, even more preferably still ≥30 and ≤70, further preferably ≥40 and ≤60, according to various embodiments. The helix pitch, i.e. the spacing between two helices, may be within the range between ≥2 mm and ≤50 mm, preferably ≥5 mm and ≤40 mm, more preferably ≥10 mm and ≤40 mm, more preferably still ≥15 mm and ≤35 mm even more preferably still ≥20 mm and ≤30 mm, according to various embodiments.

According to a further embodiment, the screw flights may be formed from a polymeric material and/or metal. Preferably, per an embodiment, the screw flight is formed from a material selected from the group comprising polytetrafluoroethylene, aluminum and/or stainless steel. The use in particular of a polymeric material such as polytetrafluoroethylene (PTFE) or polyalkylene may be advantageous for ensuring that the particles that form during the drying are transported in a manner which is gentle on the material. A further advantage of PTFE is that it is highly solvent resistant yet has good elasticity.

According to a further embodiment, the first screw conveyor housing may additionally have at least one washing solution port for introducing a washing solution into the first screw conveyor housing for washing the material.

In the context hereof, a "washing solution" for example encompasses an organic or inorganic room-temperature-liquid solvent or solvent mixture. Advantageously, the organic or inorganic room-temperature-liquid solvent or solvent mixture may be selected such that it has a high solubility for possible impurities in the material to be dried and a poor solubility for the material to be dried.

In principle, a screw conveyor housing may have two or more washing solution ports for introducing a washing solution into the screw conveyor housing. There may for example be provision according to an embodiment for the screw conveyor drying reactor to have two or more screw conveyor housings series-connected to one another, for example via bayonet and/or flange connections, i.e. a first screw conveyor housing, a second screw conveyor housing and possibly further comprising a third screw conveyor housing and so on. There may be provision here for individual screw conveyor housings not to have any washing solution ports since only drying takes place there. On the other hand, the screw conveyor drying reactor may have at least one screw conveyor housing having at least one washing solution port in which only washing of the material with a washing solution takes place.

There may further be provision according to an embodiment for at least one additional screw conveyor housing, for example a second screw conveyor housing, not to have any fluid-permeable wall section. The material may for example be dried in such a screw conveyor housing by means of a gas or gas mixture, preferably air.

According to a further embodiment, the screw conveyor drying reactor may comprise at least one permeable wall section which has at least one filter material having an average pore size in the range from ≥1 μm to ≤500 μm. For example, it is possible to use a filter material of ≥160 μm to ≤250 μm, also referred to as filter pore size 0, of ≥100 μm to ≤160 μm, also referred to as filter pore size 1, of ≥40 μm to ≤100 μm, also referred to as filter pore size 2, of ≥16 μm to ≤40 μm, also referred to as filter pore size 3, of ≥10 μm to ≤16 μm, also referred to as filter pore size 4, and/or of ≥1 μm to ≤1.6 μm, also referred to as filter pore size 5. Such filter materials are mentioned in the ISO standard ISO 4793:1980-10 and by ROBU Glasfilter-Geraete GmbH, Hattert, Germany.

Preferably, per an embodiment, the permeable wall section is at least partially designed as a glass frit and/or metal filter. Further suitable filter materials may have an average pore size in the range from ≥1.5 μm to ≤400 μm, ≥2 μm to ≤300 μm, ≤5 μm to ≤250 μm, ≥10 μm to ≤200 μm, ≥15 μm to ≤180 μm, ≥20 μm to ≤150 μm, ≥25 μm to ≤125 μm, ≥30 μm to ≤100 μm, ≥35 μm to ≤90 μm, and/or ≥40 μm to ≤80 μm, and/or ≥45 μm to ≤80 μm, and/or ≥50 μm to ≤70 μm, per various embodiments.

According to a further embodiment, the screw conveyor drying reactor may have two or more fluid-permeable wall sections, it being possible for the fluid-permeable wall sections to each have identical average pore sizes or for the fluid-permeable wall sections to differ in terms of average pore size. It may for example be advantageous when the pore sizes of the fluid-permeable wall sections become larger as the degree of drying of the material increases. This can enable rapid fluid passage as the degree of drying of the particles increases and can at the same time prevent loss of the material which might be entrained by the fluid, since at the start of drying the pore averages can be chosen to be markedly smaller.

The drying process of the fluid-comprising material may be accelerated if at least one wall of the screw conveyor drying reactor has at least one heat source. Preferably at least one wall of a screw conveyor housing may have at least one heat source; more preferably at least one wall of a first, second and/or further screw conveyor housing may have at least one heat source, per various embodiments.

The first, second and/or further screw conveyor housing of the screw conveyor drying reactor may be of tubular form. A tubular design of the screw conveyor housing enables good and virtually loss-free transport of the fluid-containing material by means of a conveying screw through the screw conveyor housing.

According to a further embodiment, the conveying screw has a shaft. According to a further embodiment, at least the first screw conveyor housing has a bearing for receiving the shaft at the start of the housing.

For a continuous and gentle transport of material by means of the conveying screw through the screw conveyor housing during the drying operation, for example for avoiding changing the particle size of the material during the drying process, it may be advantageous for the gap size between the screw helix and the screw conveyor housing to amount to ≥0.02 mm and ≤5 mm, per an embodiment.

According to a further embodiment of the screw conveyor drying reactor, a further screw conveyor housing, for example for filtration, may also adjoin the first screw conveyor housing.

This further screw conveyor housing does not necessarily need to be used only for drying, and for example in this further screw conveyor housing the material may also be washed in order to remove impurities. It is also possible to series-connect screw conveyor housings having filters of different pore sizes in order to obtain a classifying effect. The end(s) of the screw conveyor housings can preferably be connected via a flange connection.

Screw conveyor housings in which for example drying is effected by a heat source may also be referred to as drying housings. There may be provision according to an embodiment for the screw conveyor drying reactor to have at least one or more drying housings. The screw conveyor housing can be connected to the drying housing preferably via a flange connection.

The drying housing may have a conveying screw. It is also possible for the transport of the material, for example of the drying particles, to be effected by means of gravity and/or by means of conveyor belt or the like.

According to a further embodiment of the screw conveyor drying reactor, the drying housing may have a transport device for transporting the material from the inlet opening of the drying housing to the outlet of the drying housing, wherein the transport device is preferably a conveyor belt or more preferably a conveying screw.

According to a further embodiment of the screw conveyor drying reactor, the conveying screw may extend from the start of the housing of the first screw conveyor housing to the outlet opening of the first screw conveyor housing. Alternatively, the conveying screw may also extend from the start of the housing of the first screw conveyor housing to the outlet of the drying housing.

According to a further embodiment of the screw conveyor drying reactor, the drying housing may have at least one inlet port for a gas and at least one outlet opening for a gas. It may be preferable for the inflowing gas to be temperature-controlled. The gas may preferably have a temperature that is higher than the temperature of the fluid-comprising material in the screw conveyor housing, the gas may preferably have a temperature of ≥30° C. and ≤100° C., per various embodiments.

In the case of a screw conveyor drying reactor that has two or more screw conveyor housings or at least one screw conveyor housing and at least one drying housing, there may be provision for a lock to be arranged between the adjoining screw conveyor housings, or between the adjoining screw conveyor housings and drying housings, or between the adjoining drying housings, in order for example to maintain temperature differences, pressure differences or other physical differences between adjoining housings.

According to a further embodiment of the screw conveyor drying reactor, a lock may be arranged between the first screw conveyor housing and an adjoining further housing, such as a drying housing. According to a further development, such a lock may preferably be in the form of a rotary feeder.

An advantage of the screw conveyor drying reactor according to an embodiment may reside in its very compact construction. It has surprisingly been found that the screw conveyor drying reactor has a high material throughput with a compact construction. For instance, despite the compact design of the reactor, fluid-containing material can be freed from fluid while virtually preserving the original particle size distribution. The length of the first screw conveyor housing may amount to ≥5 cm and ≤150 cm, preferably ≥10 cm and ≤100 cm and more preferably ≥15 cm and ≤50 cm, per various embodiments. A screw conveyor drying reactor having just one screw conveyor housing may amount to ≥5 cm and ≤150 cm, preferably 10 cm and ≤100 cm and more preferably ≥15 cm and ≤50 cm in terms of the length thereof, per various embodiments. The length of the screw conveyor housing and the length of the screw conveyor drying reactor is measured aligned along the conveying screw.

According to a further embodiment of the screw conveyor drying reactor, the internal volume of the first screw conveyor housing may amount to ≥3 $cm^3$ and ≤3000 $cm^3$, preferably ≥10 $cm^3$ and ≤1500 $cm^3$ and more preferably ≥100 $cm^3$ and ≤500 $cm^3$.

A further subject of the present disclosure relates to a process for the continuous filtration and drying of a material that comprises a fluid. This is preferably a fluid comprising solid or solid particles, per an embodiment. The process for the continuous filtration and drying of a material that comprises a fluid, by means of a screw conveyor drying reactor according to an embodiment, wherein the material is preferably present in the form of a dispersion or suspension, and forms solid particles as a result of the extraction of the fluid, comprising the steps of:

- adding the fluid-comprising material into the inlet port, wherein the fluid-comprising material is transported through the screw conveyor housing by means of the conveying screw,
- applying a vacuum to the vacuum housing,
- discharging the fluid from the material through the gas- and liquid-permeable but solid-impermeable wall section of the screw conveyor housing into the vacuum housing,
- optionally one or more steps of washing the material by adding a solvent,
- transporting the solid particles, formed as a result of the discharging of the fluid, through the screw conveyor housing to the outlet opening by means of the conveying screw.

The process according to an embodiment features rapid filtration and drying that at the same time are extremely gentle on the material. The material forming as a result of the removal of the fluid, for example in the form of particles, exhibits virtually no friability. The particles formed virtually retain their particle size throughout the drying operation, meaning that the formation of agglomerates from these particles practically does not take place. Thus, for example, particles can also be passed through by washing for the purpose of cleaning the particles of impurities, without substantial change in the particle size by comparison with the particle size distribution before washing and after washing.

It is furthermore advantageous, per an embodiment, that the particles can be dried without compression pressure, i.e. the particles are not freed from fluid by means of a compression pressure that might be generated by reducing the spacing of the screw flights. Accordingly, there may be provision according to an embodiment for the spacing of the screw flights to be selected such that the fluid-comprising particles are not squeezed for the purpose of drying. Accordingly, in the process according to an embodiment in the case of such an arrangement of the screw flights, it can be avoided that the amount of fluid is reduced by such a pressure.

According to a further embodiment of the process for continuous filtration and drying, the shaft of the conveying screw is rotated by the drive motor at a speed of ≥0.1 rpm and ≤100 rpm, preferably ≥0.5 rpm and ≤5 rpm and more preferably ≥1 rpm and ≤10 rpm per minute, wherein the shaft is preferably rotated at a constant speed, per various embodiments.

According to a further embodiment of the process for continuous filtration and drying, the material may be transported by means of conveying screw without compression and/or pressing of the material.

According to a further embodiment of the process for continuous filtration and drying, the screw conveyor speed may be ≥0.02 cm/min and ≤500 cm/min, preferably 0.1 cm/min and ≤100 cm/min and more preferably ≥1 cm/min and ≤20 cm/min, per various embodiments.

According to a further embodiment of the process for continuous filtration and drying, a vacuum or a positive pressure, relative to atmospheric pressure of 101.325 kPa=1.01325 bar=1013.25 mbar, may be applied to the vacuum housing. According to various embodiments, the pressure applied to the vacuum housing may amount to ≤1 kPa and ≤500 kPa, preferably ≥10 kPa and ≤70 kPa and more preferably ≥30 kPa and ≤50 kPa.

According to a further embodiment of the process for continuous filtration and drying, the separated fluid may be removed from the vacuum housing, evaporated down and then resupplied to the screw conveyor drying reactor, in order for example to avoid losses of material.

According to a further embodiment of the process for continuous filtration and drying, the solid particles may be subjected to at least one further washing step and/or at least one further drying step.

BRIEF DESCRIPTION OF THE FIGURES

The subject matter of the present invention is additionally elucidated in more detail on the basis of the following figures.

DETAILED DESCRIPTION

Figure 1:
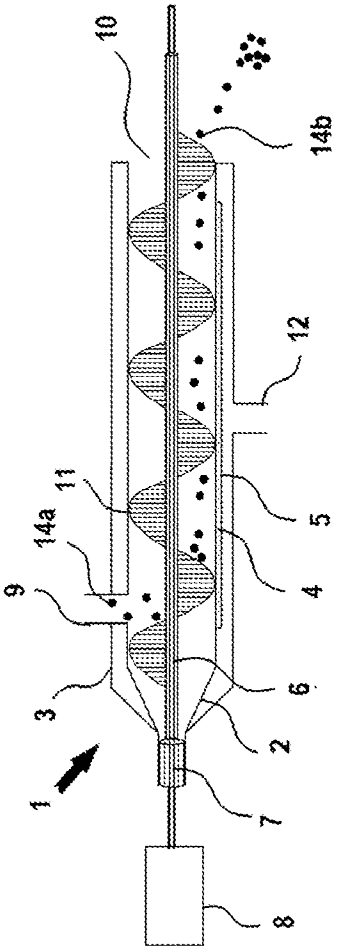
FIG. 1 shows a screw conveyor drying reactor according to an embodiment.

FIG. 1 shows a screw conveyor drying reactor 1 according to an embodiment, wherein the screw conveyor drying reactor 1 has at least a first screw conveyor housing 2 and at least one outer vacuum housing 3 that at least partially surrounds the first screw conveyor housing 2, wherein the first screw conveyor housing 2 has at least one housing wall 4, wherein this housing wall 4 has at least one gas- and liquid-permeable but solid-impermeable wall section 5, wherein the vacuum housing 3 is arranged at least below the gas- and liquid-permeable but solid-impermeable wall section 5 and receives gas and liquid passing through the permeable wall section 5, wherein a conveying screw 6 extends into the first screw conveyor housing 2 and is mounted by means of a bearing 7 at least at one end of the housing, wherein the conveying screw 6 is connected to a drive motor 8 to form a continuous rotary connection, wherein the first screw conveyor housing 2 has at least one inlet port 9 for a fluid-comprising material 14*a*, wherein the material 14 is preferably present in the form of a dispersion or suspension, and at least one outlet opening 10 for removal of the material 14*b* from which fluid has been extracted, this material being present in the form of particles, wherein the conveying screw 6 extends into the first screw conveyor housing in such a way that the material is transported from the inlet port 9 to the outlet opening 10, and wherein the conveying screw 6 has screw flights 11, wherein the vacuum housing 3 is sealed off with respect to the first screw conveyor housing 2 for the purpose of applying a vacuum, wherein the vacuum housing 3 has at least one connection port 12 for applying a vacuum and for discharging fluid which penetrates into the vacuum housing 3 through the gas- and liquid-permeable wall section 5 of the screw conveyor housing 2.

Figure 2:
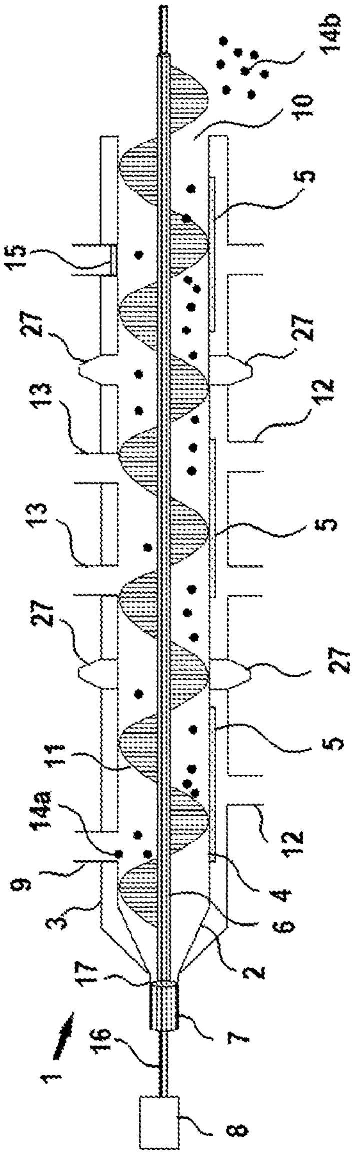
FIG. 2 shows a screw conveyor drying reactor according to an embodiment with a washing solution port.

FIG. 2 shows a screw conveyor drying reactor 1 according to the invention, wherein the screw conveyor drying reactor 1 has at least a first screw conveyor housing 2 and at least one outer vacuum housing 3 that at least partially surrounds the first screw conveyor housing 2, wherein the first screw conveyor housing 2 has at least one housing wall 4, wherein this housing wall 4 has at least one gas- and liquid-permeable but solid-impermeable wall section 5, wherein the vacuum housing 3 is arranged at least below the gas- and liquid-permeable but solid-impermeable wall section 5 and receives gas and liquid passing through the permeable wall section 5, wherein a conveying screw 6 extends into the first screw conveyor housing 2 and is mounted by means of a bearing 7 at least at one end of the housing, wherein the conveying screw 6 is connected to a drive motor 8 to form a continuous rotary connection, wherein the first screw conveyor housing 2 has at least one inlet port 9 for a fluid-comprising material 14*a*, and at least one outlet opening 10 for removal of the particles 14*b* from which fluid has been extracted, wherein the conveying screw 6 extends into the first screw conveyor housing in such a way that the material is transported from the inlet port 9 to the outlet opening 10, and wherein the conveying screw 6 has screw flights 11, wherein the vacuum housing 3 is sealed off with respect to the first screw conveyor housing 2 for the purpose of applying a vacuum, wherein the vacuum housing 3 has at least one connection port 12 for applying a vacuum and for discharging fluid which penetrates into the vacuum housing 3 through the gas- and liquid-permeable wall section 5 of the screw conveyor housing 2. The screw conveyor housing 2 may additionally have at least one washing solution port 13 for introducing a washing solution into the first screw conveyor housing 2 for washing the material 14. At least one wall of the screw conveyor housing 2 may for example have at least one heat source 15. The conveying screw 6 may furthermore have a shaft 16, wherein at least the first screw conveyor housing 2 has a bearing 7 for receiving the shaft 16 at the start of the housing 17.

Figure 3:
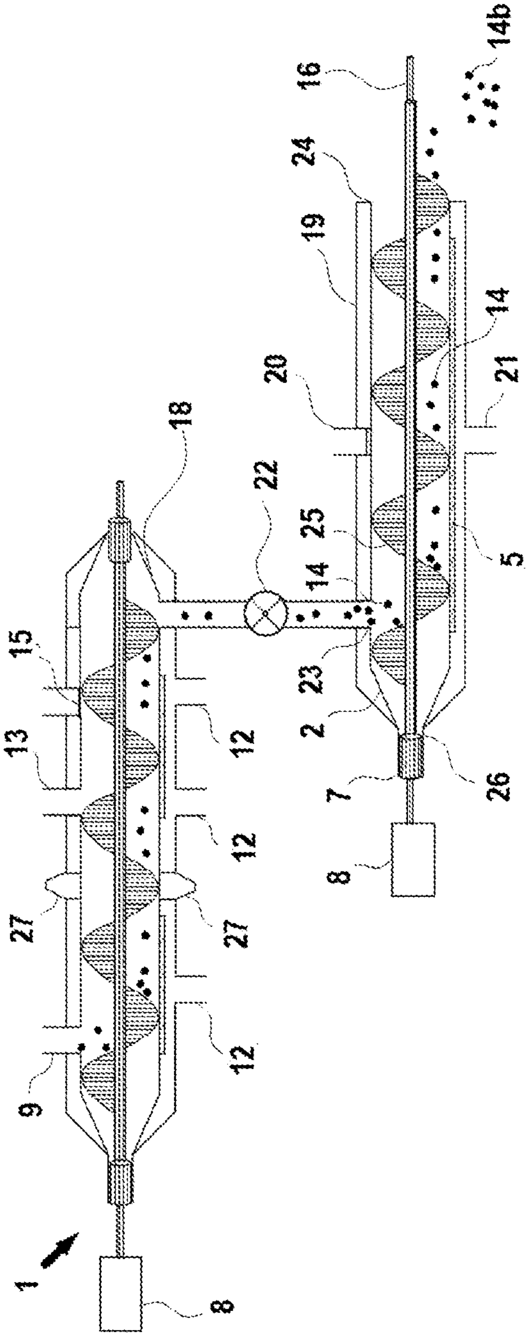
FIG. 3 shows a screw conveyor drying reactor according to an embodiment with an adjoining drying housing.

FIG. 3 shows a screw conveyor drying reactor 1 according to an embodiment as per FIG. 2, at least one drying housing 19 adjoining the end 18 of the screw conveyor housing 2, wherein the screw conveyor housing 2 is connected to the drying housing 19 preferably via a flange connection. The drying housing 19 has at least one inlet port for gas 20 and at least one outlet opening for gas 21, wherein a lock 22 is arranged between the first screw conveyor housing 2 and the adjoining drying housing 19. The drying housing 19 has a transport device for transporting the material 14 from the inlet opening 23 of the drying housing 19 to the outlet 24 of the drying housing 19, wherein the transport device is preferably a conveyor belt (not shown) or more preferably a conveying screw 25, wherein the conveying screw 25 extends at least from the start of the housing 26 of the drying housing 19 to the outlet 24 of the drying housing 19.

The drying housing 19 and the screw conveyor drying reactor 1 may have one or more flanges 27.

The advantageous properties of the screw conveyor drying reactor with respect to the particle size distribution of L-alanine during the drying operation are described below, according to an embodiment.

TABLE 1

| Experimental conditions | |
|---|---|
| Substance system | L-alanine/water |
| Solids content | 5 percent by weight |
| Suspension volume flow rate | 15 ml/min |
| $n_{screw}$ | 5 rpm |
| Pressure difference Δp | 400 mbar |
| Temperature | 23° C. |

6-fold determination

Figure 4:
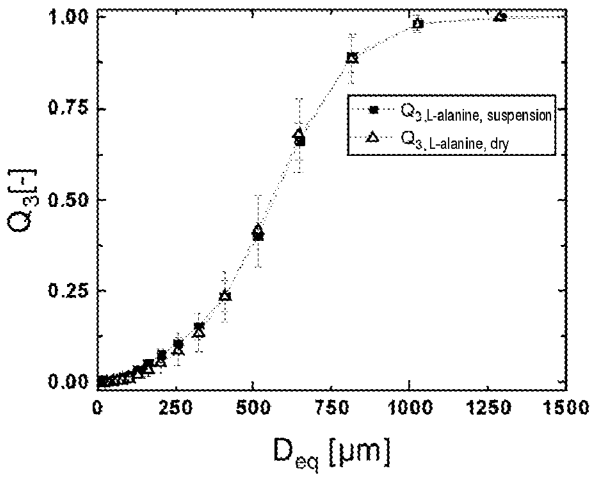
FIG. 4 shows the mass-based cumulative distribution of the L-alanine particles before and after the screw conveyor drying reactor.

FIG. 4 shows the experimentally determined particle size distributions before (illustrated as black squares) and after (illustrated as white triangles) the screw conveyor drying reactor, shown as mass-based cumulative distribution $Q_3$. As substance system, L-alanine was crystallized from aqueous solution. L-alanine is obtained from Evonik Industries AG with a purity of 99.7% and crystallized from 400 ml of Millipore water (0.215 g of L-alanine/g of $H_2O$). Crystallization from 50° C. to 23° C. was effected in a 400 ml crystallizer at a cooling rate of 0.45 K/min. A solids content of 5 percent by weight results. The particle size distribution of the crystallization suspension (black squares) was recorded by dynamic image analysis (ISO 13322-2:2006(E)) and a QICPIC Lixell sensor (Sympatec GmbH, Clausthal-Zellerfeld). After being received from the screw conveyor drying reactor, the dry particles (illustrated as white triangles) are resuspended in saturated aqueous L-alanine solution (0.159 g of L-alanine/g of $H_2O$) and determined by the same measurement method. In FIG. 4, the proportion of the total mass lying below a determined particle size $D_{eq}$ (equivalent diameter of the circle with the same projection surface area) is plotted on the ordinate.

Figure 5:
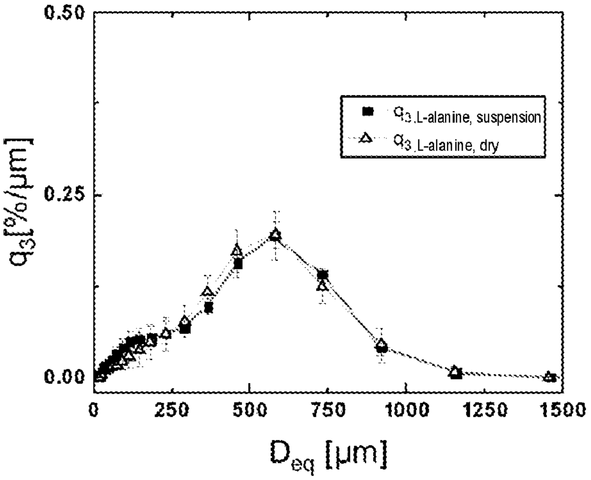
FIG. 5 shows the mass-based distribution density of the L-alanine particles before and after the screw conveyor drying reactor.

FIG. 5 shows the experimentally determined particle size distributions before (illustrated as black squares) and after (illustrated as white triangles) reception from the screw conveyor dryer, shown as mass-based density distribution $q_3$. The experimental procedure is equivalent to that in FIG. 4. In FIG. 5, the proportion of the total mass within a determined size interval based on a defined interval width is shown on the ordinate. It is thus possible to see here the probability of the particle sizes lying within a defined interval.

As emerges from FIGS. 4 and 5, the use of the screw conveyor drying reactor according to an embodiment does not have any influence on the particle size distribution of L-alanine particles.

This is supported statistically by a two-sample t-test with unequal variances, described for example in the literature by Wilhelm Kleppmann, *Versuchsplanung, Produkte und Prozesse optimieren,* 2013 and John A. Rice (2006), *Mathematical Statistics and Data Analysis*, Third Edition, Duxbury Advanced. Accordingly, the product quality is maintained virtually unchanged in terms of the particle size distribution and particle size of the crystallization material before and after drying.

The results in terms of particle size distribution and particle size of the crystallization material before and after drying by means of the screw conveyor drying reactor according to the invention were tested with a further substance system. Since the use of the screw conveyor drying reactor and the process in particular for the drying of active substances while preserving the particle size distribution and particle size may be of significance in particular for the preparation of medicines, experiments were conducted with paracetamol from ethanol, according to various embodiments.

TABLE 2

| Experimental conditions | |
|---|---|
| Substance system | paracetamol/ethanol |
| Solids content | 5 percent by weight |
| Suspension volume flow rate | 15 ml/min |
| $n_{screw}$ | 5 rpm |
| Pressure difference Δp | 200 mbar |
| Temperature | 23° C. |

3-fold determination

Figure 6:
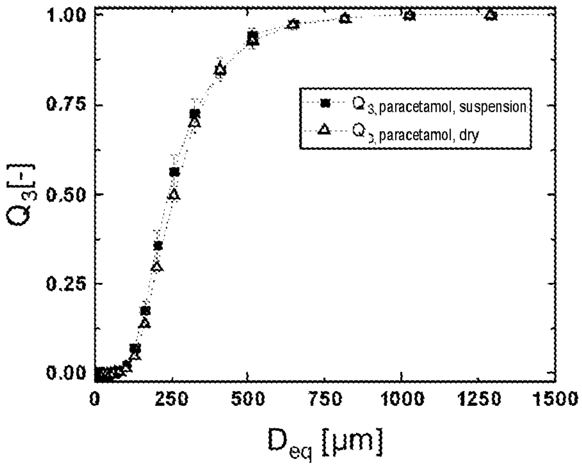
FIG. 6 shows the mass-based cumulative distribution of the paracetamol particles before and after the screw conveyor drying reactor.

FIG. 6 shows the experimentally determined particle size distributions before (illustrated as black squares) and after (illustrated as white triangles) reception from the screw conveyor drying reactor, shown as mass-based cumulative distribution $Q_3$. As substance system, paracetamol was crystallized from ethanol. Paracetamol is obtained from Alfa Aesar with a purity of 98% and crystallized from 400 ml of absolute ethanol (0.255 g of paracetamol/g of ethanol). Crystallization from 35° C. to 23° C. was effected in a 400 ml crystallizer at a cooling rate of 0.45 K/min. A solids content of 5 percent by weight results. The particle size distribution of the crystallization suspension (illustrated as black squares) was recorded by dynamic image analysis (ISO 13322-2:2006(E)) and a QICPIC Lixell sensor (Sympatec GmbH, Clausthal-Zellerfeld). After being received from the screw conveyor drying reactor, the dry particles (illustrated as white triangles) are resuspended in saturated aqueous paracetamol solution (0.013 g of paracetamol/g of water) and determined by the same measurement method. In FIG. 6, the proportion of the total mass lying below a determined particle size $D_{eq}$ (equivalent diameter of the circle with the same projection surface area) is plotted on the ordinate.

Figure 7:
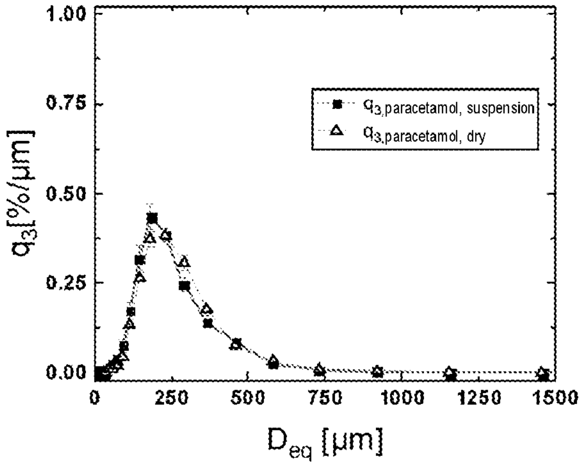
FIG. 7 shows the mass-based distribution density of the paracetamol particles before and after the screw conveyor drying reactor.

FIG. 7 shows the experimentally determined particle size distributions before and after reception from the screw conveyor dryer, shown as mass-based density distribution $q_3$. The experimental procedure is equivalent to that in FIG. 6. In FIG. 7, the proportion of the total mass within a determined size interval based on a defined interval width is shown on the ordinate. It is thus possible to see here the probability of the particles lying within a defined particle size interval.

As is shown by FIGS. 6 and 7, the use of the screw conveyor drying reactor according to an embodiment does not have any influence on the particle size distribution of paracetamol particles in comparison before and after drying by means of the screw conveyor drying reactor according to an embodiment. This is supported statistically by a two-sample t-test with unequal variances. Accordingly, the product quality of the crystallization material is maintained in comparison before and after the drying.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention.

The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A screw conveyor drying reactor, wherein the screw conveyor drying reactor has at least a first screw conveyor housing and at least one outer vacuum housing that at least partially surrounds the first screw conveyor housing,

- wherein the first screw conveyor housing has at least one housing wall, wherein the housing wall has at least one gas- and liquid-permeable but solid-impermeable wall section, wherein the vacuum housing is arranged at least below the gas- and liquid-permeable but solid-impermeable wall section and receives gas and liquid passing through the permeable wall section,
- wherein a conveying screw extends into the first screw conveyor housing and is mounted at least at one end of the first screw conveyor housing, wherein the conveying screw is connected to a drive motor to form a continuous rotary connection,
- wherein the first screw conveyor housing has at least one inlet port for a fluid-comprising material, and at least one outlet opening for removal of particles from which fluid has been extracted,
- wherein the conveying screw extends into the first screw conveyor housing in such a way that the material is transported from the inlet port to the outlet opening, and wherein the conveying screw has screw flights,
- wherein the vacuum housing is sealed off with respect to the first screw conveyor housing for the purpose of applying a vacuum,
- wherein the vacuum housing has at least one connection port for applying a vacuum and for discharging fluid which penetrates into the vacuum housing through the gas- and liquid-permeable wall section of the screw conveyor housing,
- wherein the first screw conveyor housing additionally has at least one washing solution port for introducing a washing solution into the first screw conveyor housing for washing the material.

2. The screw conveyor drying reactor as claimed in claim 1, wherein the screw flights are spaced apart in a regular, varying manner or in an irregular manner.

3. The screw conveyor drying reactor as claimed in claim 1, wherein the screw flights are formed from a material selected from the group consisting of polytetrafluoroethylene, aluminum and/or stainless steel.

4. The screw conveyor drying reactor as claimed in claim 1, wherein the permeable wall section has a filter material having an average pore size in the range from ≥1 μm to ≤500 μm, the permeable wall section is at least partially in the form of a glass frit and/or metal filter.

5. The screw conveyor drying reactor as claimed in claim 1, wherein at least one wall of a screw conveyor housing has at least one heat source.

6. The screw conveyor drying reactor as claimed in claim 1, wherein the first screw conveyor housing is of tubular form.

7. The screw conveyor drying reactor as claimed in claim 1, wherein the conveying screw has a shaft.

8. The screw conveyor drying reactor as claimed in claim 7, wherein at least the first screw conveyor housing has a bearing for receiving the shaft at the start of the first screw conveyor housing.

9. The screw conveyor drying reactor as claimed in claim 1, wherein a gap size between a screw helix and the screw conveyor housing amounts to ≥0.02 mm and ≤5 mm.

10. The screw conveyor drying reactor as claimed in claim 1, wherein at least one drying housing adjoins and is connected to the end of the first screw conveyor housing via a flange connection.

11. The screw conveyor drying reactor as claimed in claim 10, wherein the drying housing has at least one inlet port for gas and at least one outlet opening for gas, wherein the inflowing gas has a temperature that is higher than the temperature of the fluid-comprising material in the screw conveyor housing, of ≥30° C. and ≤100° C.

12. The screw conveyor drying reactor as claimed in claim 10, wherein a lock is arranged between the first screw conveyor housing and the adjoining drying housing, wherein the lock is a rotary feeder.

13. The screw conveyor drying reactor as claimed in claim 10, wherein the conveying screw is a first conveying screw, and wherein the drying housing has a transport device comprising a conveyor belt or a further conveying screw, the transport device for transporting the material from the inlet opening of the drying housing to the outlet of the drying housing.

14. The screw conveyor drying reactor as claimed in claim 13, wherein the first conveying screw extends from the start of the first screw conveyor housing to the outlet opening of the first screw conveyor housing; or

- wherein the further conveying screw extends from the start of a further screw conveyor housing to the outlet of the drying housing.

15. The screw conveyor drying reactor as claimed in claim 1, wherein a length of the first screw conveyor housing amounts to ≥5 cm and ≤150 cm.

16. The screw conveyor drying reactor as claimed in claim 1, wherein an internal volume of the first screw conveyor housing amounts to ≥3 $cm^3$ and ≤3000 $cm^3$.

17. The screw conveyor drying reactor as claimed in claim 1, wherein the screw flights are formed from a polymeric material and/or a metal.

18. A process for the continuous filtration and drying of a material that comprises a fluid, by means of a screw conveyor drying reactor as claimed in claim 1, wherein the material is present in the form of a dispersion or suspension, and forms solid particles as a result of the extraction of the fluid, comprising the steps of:

- adding the fluid-comprising material into the inlet port, wherein the fluid-comprising material is transported through the screw conveyor housing by means of the conveying screw,
- applying a vacuum to the vacuum housing, discharging the fluid from the material through the gas- and liquid-permeable but solid-impermeable wall section of the screw conveyor housing into the vacuum housing, optionally one or more steps of washing the material by adding a solvent, transporting the solid particles, formed as a result of the discharging of the fluid, through the screw conveyor housing to the outlet opening by means of the conveying screw.

19. The process for continuous filtration and drying as claimed in claim 18, wherein a shaft of the conveying screw is rotated by the drive motor at a speed of ≥0.1 rpm and ≤100 rpm, wherein the shaft is rotated at a constant speed.

20. The process for continuous filtration and drying as claimed in claim 18, wherein the material is transported by means of conveying screw without compression and/or pressing of the material.

21. The process for continuous filtration and drying as claimed in claim 18, wherein the screw conveyor speed is ≥0.02 cm/min and ≤500 cm/min.

22. The process for continuous filtration and drying as claimed in claim 18, wherein the pressure applied to the vacuum housing amounts to ≥1 kPa and ≤500 kP.

23. The process for continuous filtration and drying as claimed in claim 18, wherein the separated fluid is removed from the vacuum housing, evaporated down and then resupplied to the screw conveyor drying reactor.

24. The process for continuous filtration and drying as claimed in claim 18, wherein the solid particles are subjected to at least one further washing step and/or at least one further drying step.

* * * * *